April 6, 1926.
H. J. BARNDT ET AL
1,579,431
CIRCUIT CLOSER
Filed Dec. 28, 1922    2 Sheets-Sheet 1
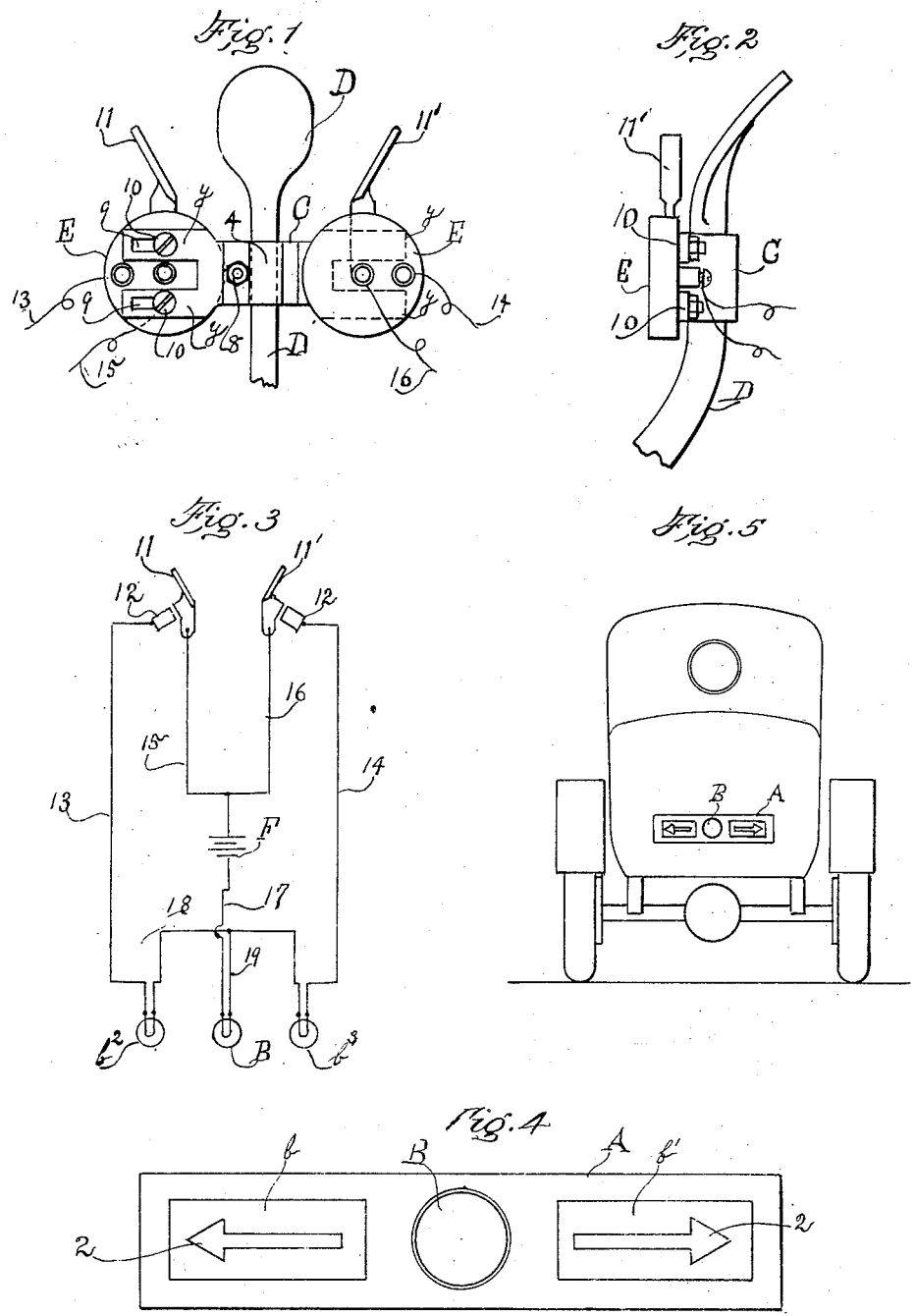
INVENTOR
Herbert J. Barndt
Andrew K. Birrell
BY   ATTORNEY
F. N. Gilbert April 6, 1926. 1,579,431
H. J. BARNDT ET AL
CIRCUIT CLOSER
Filed Dec. 28, 1922 2 Sheets-Sheet 2
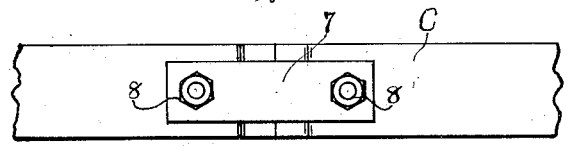
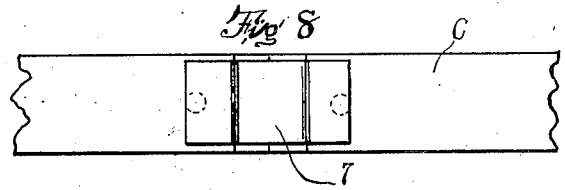
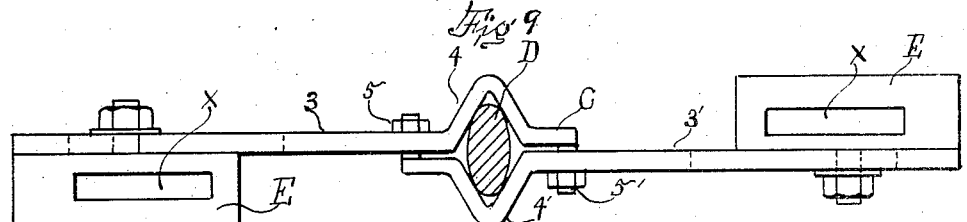
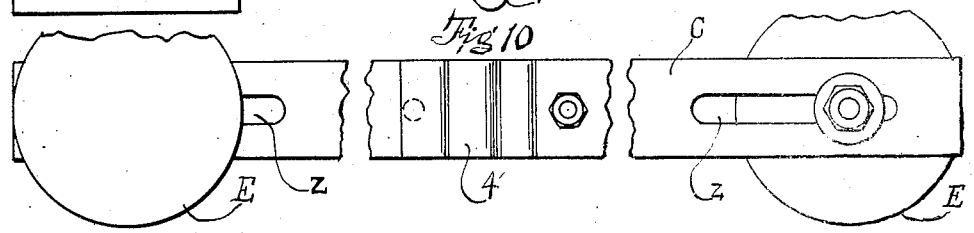
INVENTOR
Herbert J. Barndt
Andrew K. Birrell
BY ATTORNEY
F. N. Gilbert Patented Apr. 6, 1926.

1,579,431

UNITED STATES PATENT OFFICE.

HERBERT J. BARNDT AND ANDREW K. BIRRELL, OF BINGHAMTON, NEW YORK.

CIRCUIT CLOSER.

Application filed December 28, 1922. Serial No. 609,456.

*To all whom it may concern:*

Be it known that we, HERBERT J. BARNDT and ANDREW K. BIRRELL, the former a citizen of the United States, the latter a subject of the King of Great Britain, residing at Binghamton, in the county of Broome and State of New York, have invented certain new and useful Improvements in Circuit Closers, of which the following is a specification.

Our invention relates to improvements in circuit closers, more particularly circuit closers used with adjustably operated and mounted direction indicators for automobiles and it has for its object to provide a circuit closer adapted to be removably mounted on the stop or brake or clutch pedal of the automobile and connected with a rear direction signal and combining simplicity and adjustability for operation with adaptability of attachment to various forms of pedals.

With these objects in view our invention consists in certain novel features of construction and arrangement of parts as are hereinafter more clearly described and pointed out in the claims, reference being had to the accompanying drawings in which:

Fig. 1 is a front elevation of our device as applied to a pedal.

Fig. 2 is an end elevation of our device.

Fig. 3 is a plan view of the wiring system of our device.

Fig. 4 is an end elevation of a part of our device.

Fig. 5 is a front elevation of a part of our device, mounted on an automobile.

Fig. 6 is a front view of a fragmentary part of our device.

Fig. 7 is a plan view of a part of our device.

Fig. 8 is a rear view of a part of our device.

Fig. 9 is a plan view of a part of our device.

Fig. 10 is a front elevation of a part of our device.

The same reference characters denote like parts in each of the several figures of the drawings.

In carrying out our invention we provide a signal box casing A, mounted on the rear of the automobile body and having in the center thereof the usual automobile stop light B and in said casing on either side of said stop light a transparent lens, which may be colored or otherwise and having described on the face thereof direction pointers or arrows 2. 2, one pointing to the right and the other to the left and within the casings back of the lens an electric light $b^2$ and $b^3$ with electrical connections from said lights to the brake mechanism or stop lever D, in the front of the automobile body and means connecting said signal lights with one or more levers mounted on the controlling stop or brake or clutch pedal for displaying such signal lights in the casing at will, in connection with or independent of the stop light. The signal casing A may be divided into compartments having a light in each compartment and a section of the lens with pointer thereon, mounted in front of the compartment; a section of the lens $b$ and $b'$ with pointer thereon may be mounted in front of the compartment so that in operation one signal light may be displayed independent of the other and each being an independent operation from the brake or stop signal in the center of the casing.

As a further part of our device, we have the clamping lever support C, composed of a horizontally mounted plate or bar, mounted on the brake or stop pedal D, and which support may be also divided into two sections, 3 and 3', in which formation each section having on the inner end thereof the V-shaped form 4 and 4' and which may be united together as shown in Fig. 9, by means of the nut bolts 5 and 5', passing therethru or in any other convenient manner, for adjustably clamping the support C in position upon the pedal D. When the lever support C is formed of one section, it is fashioned with the V-shaped bend 6, forming the interior recess 6', as shown in Fig. 7 and opposite the recess, we mount the V-shaped clamp 7 which may be mounted on C by means of the nut bolts 8. 8. It is to be noted that the outer ends of support C, whether constructed in one piece or divided, are forked, having the outward extending parallel lugs y. y and thru each of which extends the slots 9. 9, or the end may be straight having a single slot z shown in Fig. 10. Adjustably and slidably mounted on the forked ends of support C and by means of the set screws 10. 10, passing thru the slots 9. 9 or z and mounted therethru, we have the switch boxes E. E, each mounted on an opposite side of the forked support C, or straight support C; resiliently and pivotally mounted in the switch box E. E, we have the vertical foot levers 11. 11′ and also mounted therein, we have the point of contact 12. 12′. Between the point of contact 12 and signal light $b^2$, we have the wire 13 and between the point of contact 12′ and the signal light $b^3$, we have the wire 14; between the lever 11 and the battery F, we have the wire 15; between the lever 11′ and battery F, we have the wire 16; between the battery F and the stop light B, we have the wire 17; between the light $b^2$ and the light $b^3$, we have the wire 18 and between the stop light B and the wire 18, we have the wire 19. The vertical foot levers 11. 11′ mounted in the switch box E. E pass thru slots in the outer surface of the same, so as to permit a free pivotal movement to the right or left. The levers 11 and 11′ are held resiliently out of contact with the contact points 12 and 12′ by a spring support mounted in any convenient manner inside the casings.

It it to be noted that the V-shaped clamps are adapted to grasp and grip firmly the various forms of pedals and forming a firm support for the foot levers, adjustably and removably mounted.

In the operation of our device we first mount the lever supports C on the pedal D by clamping the support around the pedal D securely held in position by the nut bolts mentioned. We then adjust the foot levers on either side to a distance apart, convenient for the size of foot using the pedal and clamp the same in position, the wire connections having been made with the signal direction lights $b^2$ and $b^3$ and the stop light B, our device is ready for operation. If we desire to turn to the right the foot pressing the pedal D vertically downward displays by the electric current in connection with the stop light B, the illumination of the stop light by and in the same movement, by pushing the foot to the right, it contacts with the lever 11′, making the lever contact with the point 12′ and thus an electrical circuit is formed thru the wires 16, 17 and the wire 14, in connection with the direction light $b^3$. If we desire to turn to the left, we slow down by pressing upon the stop lever D and by pushing the foot to the left in the same movement, we contact with the lever 11, moving it to the left, bringing it in contact with the contact point 12 and thus forming an electrical circuit by the wires 13 and 15 with the battery F and with the left hand signal lights $b^2$, so that the direction signal and the stop signal or the slow down signal may be displayed at the same time.

Having thus described our invention what we claim as new and for which we desire Letters Patent is as follows:

1. In a circuit closer in combination with a control lever, an adjustable and removable support, said support having forked and slotted ends with an adjustable V-shaped depression adapted to receive and be clamped upon the control lever, electrical switch arms pivotally and resiliently mounted on each side of the support and adapted to receive lateral movement to engage electrical contacts.

2. A circuit closing device comprising a transverse bar provided with a depression near one end, a clamp adapted to be secured to the transverse bar over the depression for retaining the shaft of a control lever, said transverse bar having adjustably secured at one end a pivotally operating switch arm, said switch arm being adapted to receive lateral movement for engaging an electric contact.

3. A circuit closing device comprising a transverse bar having forked and slotted ends and provided intermediate its ends with a depression, a clamping member adapted to be secured to the transverse bar over the depression for retaining the shaft of a control lever, switch boxes adjustably secured to the slotted and forked ends of the bar, switch arms pivotally and resiliently mounted in the switch boxes and electric contacts adapted to be engaged by the supports.

In testimony whereof we have affixed our signatures.

HERBERT J. BARNDT.
ANDREW K. BIRRELL.